United States Patent
Zhang

(10) Patent No.: US 7,729,456 B2
(45) Date of Patent: Jun. 1, 2010

(54) BURST DETECTION APPARATUS AND METHOD FOR RADIO FREQUENCY RECEIVERS

(75) Inventor: LiJun Zhang, Beijing (CN)

(73) Assignee: Via Technologies, Inc., Taipei (TW)

( * ) Notice: Subject to any disclaimer, the term of this patent is extended or adjusted under 35 U.S.C. 154(b) by 1596 days.

(21) Appl. No.: 10/989,327

(22) Filed: Nov. 17, 2004

(65) Prior Publication Data

US 2006/0104388 A1    May 18, 2006

(51) Int. Cl.
    *H04L 27/06* (2006.01)
(52) U.S. Cl. ............... 375/340; 375/229; 375/232; 375/233; 375/316
(58) Field of Classification Search ............ 375/146, 375/316, 340
    See application file for complete search history.

(56) References Cited

U.S. PATENT DOCUMENTS

| | | | | |
|---|---|---|---|---|
| 5,317,522 A | * | 5/1994 | Bonet et al. | 700/280 |
| 5,563,908 A | * | 10/1996 | Kaku et al. | 375/222 |
| 5,724,657 A | * | 3/1998 | Lin et al. | 455/423 |
| 5,771,486 A | * | 6/1998 | Chan et al. | 704/200 |
| 6,504,862 B1 | * | 1/2003 | Yang | 375/146 |
| 6,529,850 B2 | * | 3/2003 | Wilborn et al. | 702/142 |
| 6,751,271 B2 | * | 6/2004 | Kien et al. | 375/326 |
| 7,110,478 B2 | * | 9/2006 | Lin et al. | 375/340 |
| 2002/0169602 A1 | * | 11/2002 | Hodges | 704/211 |
| 2002/0181622 A1 | * | 12/2002 | Boutros et al. | 375/343 |
| 2003/0063576 A1 | * | 4/2003 | DiFazio | 370/280 |
| 2008/0043829 A1 | * | 2/2008 | Shiue et al. | 375/232 |

OTHER PUBLICATIONS

Skold et al. "Cellular Evolution into Wideband Services", IEEE 1997.*

* cited by examiner

*Primary Examiner*—David C Payne
*Assistant Examiner*—Leon Flores
(74) *Attorney, Agent, or Firm*—Thomas, Kayden, Horstemeyer & Risley

(57) ABSTRACT

The present invention discloses a burst detection apparatus and method. The burst detection apparatus of the present invention comprises a power module, a soft-metric RMS module, and a quality determination module. The bust detection method comprises the following steps: At first, a reciprocal value of the received signal's power is calculated. Next, a RMS value of the soft-metrics according to the received signal is computed. At last, a product of the reciprocal value and the RMS value is compared with a given threshold value to generate a Boolean outcome as a quality determination decision. If the product of these values is lower than the given threshold value, it means the received signal is believed as noise; otherwise, it is believed as the real signal.

21 Claims, 3 Drawing Sheets

BURST DETECTION APPARATUS AND METHOD FOR RADIO FREQUENCY RECEIVERS

BACKGROUND OF THE INVENTION

1. Field of the Invention

The present invention generally relates to a radio frequency receiver, and more particularly, to a burst detection apparatus and method for radio frequency receivers.

2. Description of the Prior Art

In a communication field environment, the reception methods of RF (radio frequency) signal have to distinguish the desired signal from the noise. Naturally, the desired signal and noise cannot be fully recognized by these reception methods. Therefore, the probability of mistaking noise as signal is denoted as $P_{signal|noise}$. Like wise, the probability of mistaking signal as noise is denoted as $P_{noise|signal}$. It is desired in the field of the art to reduce both the above-mentioned probabilities.

A so-called "burst detection" method is used to determine whether the received signal is a desired signal or noise. In some communication systems, wrong outcomes of burst detection method would lead to communication delays, interruptions, data drops, or even channel breakdowns. For example, the well-known GSM (Global System for Mobile communications) specification 11.10 defines that the frequency emitted should be kept within a precise range. Usually, an AFC (Automatic Frequency Control) mechanism is provided to maintain the precision of frequency. Besides, the GSM specification 11.10 requires that during a temporary gap of absence of the required signal, the MS (Mobile Station) shall maintain the frequency and timing of its transmission. If the received waves is determined by the burst detection method as noise, the frequency estimated by the AFC will be cast away in order to maintain the precision of frequency. If the result from the frequency estimation of noise is accepted, the consequence may lead to the loss of traffic or even a release of a channel.

A well known burst detection method, the correlation algorithm, is chosen to determine a correlation value. In order to perform this correlation method, a pre-acknowledged training sequence is included in the signal burst as well as the synchronization should be performed. Since noise has little correlation with the acknowledged training sequence, whenever the strengths of the received signals are equal, the correlation value of noise generated by the correlation algorithm should be much less than the correlation value of the desired signal. Hence, a threshold value is compared with the normalized correlation peak value in order to determine whether the received signal is a desired signal or noise. In a GSM system, a correlation value below the given threshold value leads to a rejection of the frequency estimated by the AFC function. Otherwise, a correlation value higher than the chosen threshold guarantees that the estimated frequency by the AFC would be adopted.

By adjusting the selectable threshold value, $P_{signal|noise}$ can be reduced to an acceptable level effectively while keeping $P_{noise|signal}$ at a fairly low level. However, the method has two shortcomings. First, the length of training code sequence is merely 26, false correlation peak value may be appeared. It is possible to mistake noise as signal. Second, in multi-path propagation, if signal strengths of two or more paths are similar, the normalized correlation peak value according to the strength of one path may be lower than the threshold. In consequence, it is possible to mistake signal as noise.

In summary, it is desired to have a receiver apparatus and method to reduce the probabilities of mistaking noise as signal, and vice versa.

SUMMARY OF THE INVENTION

In view of the foregoing, a burst detection apparatus for radio frequency reception is disclosed in the present invention. In one embodiment, the burst detection apparatus comprises a power module, a soft-metric RMS (Root Mean Square) module, and a quality determination module. Both the power module and the soft-metric RMS module take digital input signal, which is down converted and then quantized by A/D converter from the RF signal, which comprises an in-phase input signal and a quadrature input signal. An output of the power module is computed as the reciprocal of the signal's power. Concurrently, an output of the soft-metric RMS module is calculated as the RMS of the soft-metrics according to the input signals. After all, the product of these two outputs is compared to a given threshold value in the quality determination module. If the product of these values is lower than the given threshold value, it means the received signal is believed as noise; otherwise, it is believed as the real signal.

In another embodiment in accordance with the present invention, a disclosed burst detection apparatus comprises an in-phase module, a quadrature module, a soft-metric equalizer module, a RMS module, and a quality determination module. The soft-metric equalizer module takes digital input which is down converted and then quantized from the RF input, which comprises an in-phase input and a quadrature input. An output of the in-phase module is computed as the sum of the in-phase input signal's power. Similarly, an output of the quadrature module is computed as the sum of the quadrature input signal's power. Concurrently, a series output of soft-metric values is calculated by the soft-metric equalizer module according to the input signal. Therefore a RMS value of the series output is calculated by the RMS module. After all, the product of the RMS value and a reciprocal of the sums from the in-phase module and the quadrature module is compared to a given threshold value in the quality determination module. If the product of these values is lower than the given threshold value, it means the received signal is believed as noise; otherwise, it is believed as the real signal.

The present invention further discloses a burst detection method which comprises the following steps: At first, a reciprocal value of the received signal's power is calculated. Next, a RMS value of the soft-metric algorithm according to the received signal is computed. At last, a product of the reciprocal value and the RMS value is compared with a given threshold value to generate a Boolean outcome as a quality determination decision. If the product of these values is lower than the given threshold value, it means the received signal is believed as noise; otherwise, it is believed as the real signal.

One objective of the present invention is to lower the probability of mistaking noise as signal in one-path and multi-path propagation circumstances.

Another objective of the present invention is to improve the probability of mistaking signal as noise while keeping the probability of mistaking noise as signal low enough.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

Figure 1:
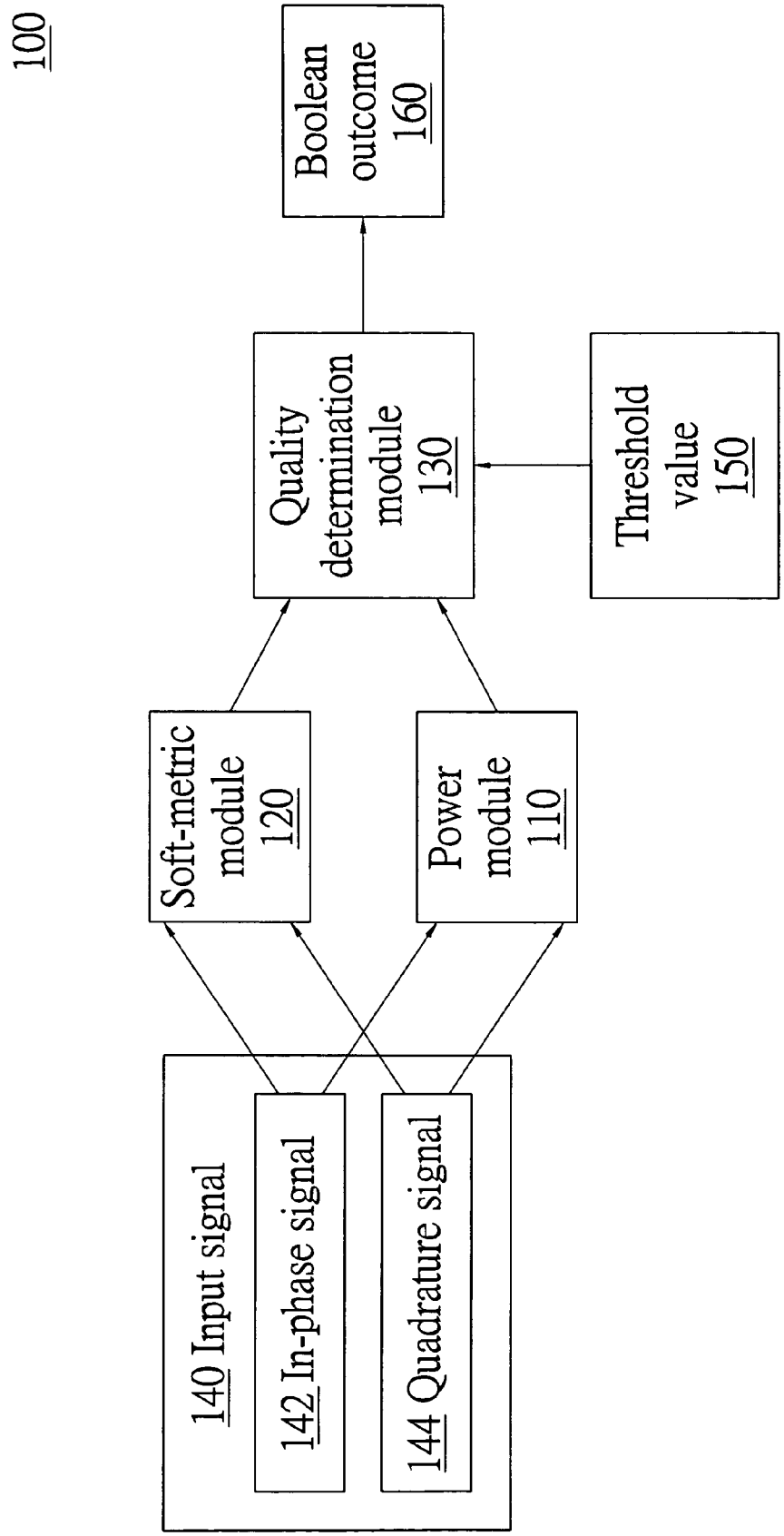
FIG. 1 is a block diagram illustrates a burst detection apparatus of an embodiment in accordance with the present invention.

The present disclosure can be described by the embodiments given below. It is understood, however, that the embodiments below are not necessarily limitations to the present disclosure, but are used to a typical implementation of the invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary the intent is to cover all alternatives, modifications and equivalents included within the spirit and scope of the invention as defined by the appended claims.

It is noted that the drawings presents herein have been provided to illustrate certain features and aspects of embodiments of the invention. It will be appreciated from the description provided herein that a variety of alternative embodiments and implementations may be realized, consistent with the scope and spirit of the present invention.

It is also noted that the drawings presents herein are not consistent with the same scale. Some scales of some components are not proportional to the scales of other components in order to provide comprehensive descriptions and emphasizes to this present invention.

Please refer to the FIG. 1, which shows a block diagram of a burst detection apparatus 100 of an embodiment in accordance with the present invention. The burst detection apparatus 100 comprises a power module 110, a soft-metric RMS (Root Mean Square) module 120, and a quality determination module 130. Both the power module 110 and the soft-metric RMS module 120 take digital signal which is down converted from RF signal and quantized by A/D converter as the input 140, which comprises an in-phase input signal 142 and a quadrature input signal 144. Furthermore, the in-phase input signal 142 is denoted as $r_I$, and the quadrature input signal 144 is denoted as $r_Q$.

In this regards, the power module 110 is used to compute a reciprocal of the sum of the received signal's power. Taking the in-phase input signal 142 and the quadrature input signal 144, an output $m_1$ of the power module 110 is computed by Equation 1 below:

$$m_1 = \frac{1}{\sum_i |r_I(i)|^2 + \sum_i |r_Q(i)|^2} \quad \text{Equation 1}$$

Besides, the soft-metric RMS module 120 is used to perform a soft-metric calculation and a RMS computation. In one implementation, but not limited to, the soft-metric calculation used in the present invention can be based on an IEEE paper, "OPTIMUM AND SUB-OPTIMUM DETECTION OF CODED DATA DISTRIBUTED BY TIME-VARYING INTERSYMBOL INTERFERENCE" by Wolfgang Koch and Alfred Baier. In this paper, an equalization algorithm is presented which delivers the optimal soft-decision information for the channel decoder in case of ideal interleaving. Simplified variants with a complexity comparable to a conventional Viterbi equalizer are also presented here which perform almost as well as the optimum. After the soft-metric value is derived, a RMS value $m_2$ of the soft-metric value would be generated, as shown in the following equation, Equation 2. The RMS value $m_2$ is also the output of the soft-metric RMS (Root Mean Square) module 120.

$$m_2 = \sqrt{\frac{\sum_i (\text{soft} - \text{metric}(i))^2}{N}} \quad \text{Equation 2}$$

where N is the number of the encoded data which are mapped onto a burst.

As shown in FIG. 1, in addition to the output value $m_1$ of the power module 110 and the output value $m_2$ as the inputs, a pre-determined threshold value 150 is also feed into the quality determination module 130. The quality determination module 130 multiplies the values $m_1$ and $m_2$, and after calculating the product of these values $m_1$ and $m_2$, the product is then compared with the threshold value 150 to generate a Boolean outcome value 160 of the apparatus 100. Functions performed by the quality determination module 130 can be summarized in Equation 3.

$$\text{quality-outcome} = m_1 \otimes m_2 ? \text{threshold} \quad \text{Equation 3}$$

If the product of these values is lower than the given threshold value 150, it means the received signal is believed as noise; otherwise, it is believed as the real desired signal.

The magnitude of the soft decision metric represents the confidence level of the decision, which can be used to detect the noise. When the noise is received, the confidence of the soft decision metric would be quite low, which is at least lower than the soft-metric of real signal. By this virtue of the soft decision metric algorithm, it reduces the possibility of mistaking noise as signal; also, it removes the situation of normalizing a correlation peak value according to strengths of multi-path propagation, therefore the possibility of mistaking signal as noise is reduced. In other words, the $P_{signal|noise}$ can be lowered by using the soft decision metric algorithm. From another perspective of view, the problem of mistaking signal as noise is still existed in a multi-path propagation. When the signal to noise ratio is quite low, although the received signal is real, the confidence level of the soft decision metric algorithm is very un-trustable. Hence the frequency estimation should be dropped out due to this un-reliable soft decision metric algorithm outcome, which is lower than a normal given threshold value.

In another example, which is applicable in GSM, of the embodiment in accordance with the present invention, the parameters of Equation 1 and 2 can be specified. On traffic channel of GSM, normal bursts which follow the bit format in Table 1 are transmitted.

TABLE 1

Bit Format of GSM burst

| Bit Number | Length of field | Contents of field |
|---|---|---|
| 0~2 | 3 | tail bits |
| 3~60 | 58 | encrypted bits (e0~e57) |
| 61~86 | 26 | Training sequence bits |
| 87~144 | 58 | encrypted bits (e58~e115) |
| 145~147 | 3 | tail bits |
| 148~156 | 8 | guard period bits |

Hence, Equation 4 specified for GSM is derived from Equation 1 is stated below:

$$m_1 = \frac{1}{\sum_{i=0}^{147} |r_I(i)|^2 + \sum_{i=0}^{147} |r_Q(i)|^2} \qquad \text{Equation 4}$$

In Equation 1, the required bits of the calculation is chosen from the entire or a portion of 148 bits according to various needs.

As shown in Table 1, there are 116 encrypted bits (e0~e115) in a GSM burst. Since the e57 and e58 bits are used as flags for indication of control channel signaling, these two bits would not be taken in part of soft-metric algorithm. A soft-metric value of these 114 encrypted bits (e0~e56, e59~e115) would be computed in Equation 5, as derived from the Equation 2.

$$m_2 = \sqrt{\frac{\sum_{i=0}^{113} (\text{soft} - \text{metric}(i))^2}{114}} \qquad \text{Equation 5}$$

In case of the product of these values is lower than the given threshold value 150, it means the received signal is believed as noise. Therefore, the frequency estimation of the AFC function is cast away. Otherwise, when the product is larger than the given threshold value 150, the frequency estimation would be accepted.

Figure 2:
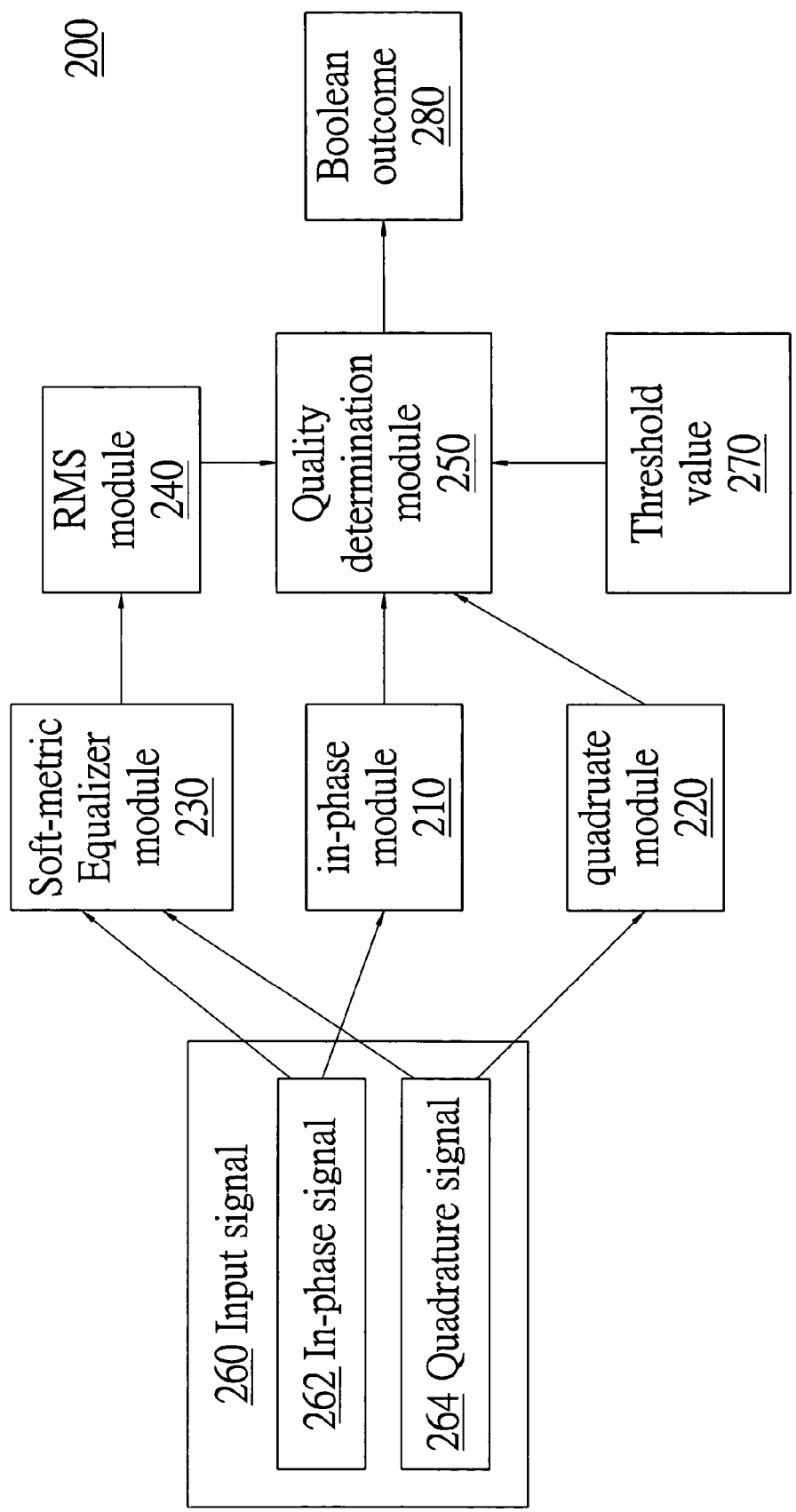
FIG. 2 is a block diagram illustrates a burst detection apparatus of another embodiment in accordance with the present invention.

Please refer to the FIG. 2, which shows a block diagram of a burst detection apparatus 200 of another embodiment in accordance with the present invention. The burst detection apparatus 200 comprises an in-phase module 210, a quadrature module 220, a soft-metric equalizer module 230, a RMS (Root Mean Square) module 240, and a quality determination module 250. The received signal is denoted as an input signal 260, which comprises an in-phase input signal 262 and a quadrature input signal 264. Furthermore, the in-phase input signal 262 is also denoted as $r_I$, and the quadrature input signal 264 is denoted as $r_Q$.

In this regards, the in-phase module 210 is used to compute a sum of the in-phase signal's power value. Taking the in-phase input signal 262, an output $m_3$ of the in-phase module 210 is computed by Equation 6 below:

$$m_3 = \sum_i |r_I(i)|^2 \qquad \text{Equation 6}$$

Like wise, the quadrature module 220 is used to compute a sum of the quadrature signal's power value. Taking the quadrature input signal 264, an output $m_4$ of the quadrature module 220 is computed by Equation 7 below:

$$m_4 = \sum_i |r_Q(i)|^2 \qquad \text{Equation 7}$$

In this embodiment, the mentioned equalization of Wolfgang Koch and Alfred Baier is performed by the soft-metric equalizer module 230. Taking the input signal 260, the in-phase signal 262 and the quadrature signal 264, an series output $m_5$ of soft-metric values is derived by the soft-metric equalizer module 230. Next, after receiving the series output $m_5$, a RMS value $m_6$ is generated in the following equation, Equation 8. The RMS value $m_6$ is also the output of the RMS module 240.

$$m_6 = \sqrt{\frac{\sum_i (m_5)^2}{N}} \qquad \text{Equation 8}$$

where N is the number of the encoded data which are mapped onto a burst.

As shown in FIG. 2, in addition to the output values $m_3$, $m_4$, and $m_6$ as the inputs, a pre-determined threshold value 270 is also feed into the quality determination module 250. The quality determination module 250 multiplies the RMS value $m_6$ and a reciprocal of the sum of $m_3$ and $m_4$, and after calculating the product of the RMS value and the reciprocal, the product is then compared with the threshold value 270 to generate a Boolean outcome value 280 of the apparatus 200. Functions performed by the quality determination module 250 can be summarized in Equation 9.

$$\text{quality} - \text{outcome} = \frac{m_6}{m_3 + m_4} \text{?threshold} \qquad \text{Equation 9}$$

If the product of these values is lower than the given threshold value 270, it means the received signal is believed as noise; otherwise, it is believed as the real desired signal.

In another example, which is applicable in GSM, of the embodiment in accordance with the present invention, the parameters of Equation 1 and 2 can be specified. On traffic channel of GSM, normal bursts which follow the bit format in Table 1 are transmitted. Hence, Equation 10 specified for GSM is derived from Equation 6 is stated below:

$$m_3 = \sum_{i=0}^{147} |r_I(i)|^2 \qquad \text{Equation 10}$$

Similarly, Equation 11 specified for GSM is derived from Equation 7 is stated below:

$$m_4 = \sum_{i=0}^{147} |r_Q(i)|^2 \qquad \text{Equation 11}$$

As shown in Table 1, there are 116 encrypted bits (e0~e115) in a GSM burst. Since the e57 and e58 bits are used as flags for indication of control channel signaling, these two bits would not be taken in part of soft-metric algorithm. A soft-metric value of these 114 encrypted bits (e0~e56, e59~e115) would be computed in Equation 12, as derived from the Equation 8.

$$m_6 = \sqrt{\frac{\sum_{i=0}^{113}(m_5)^2}{114}}$$

Equation 12

In case of the product of these values is lower than the given threshold value 270, it means the received signal is believed as noise. Therefore, the frequency estimation of the AFC function of GSM specifications is cast away. Otherwise, when the product is larger than the given threshold value 270, the frequency estimation would be accepted.

Figure 3:
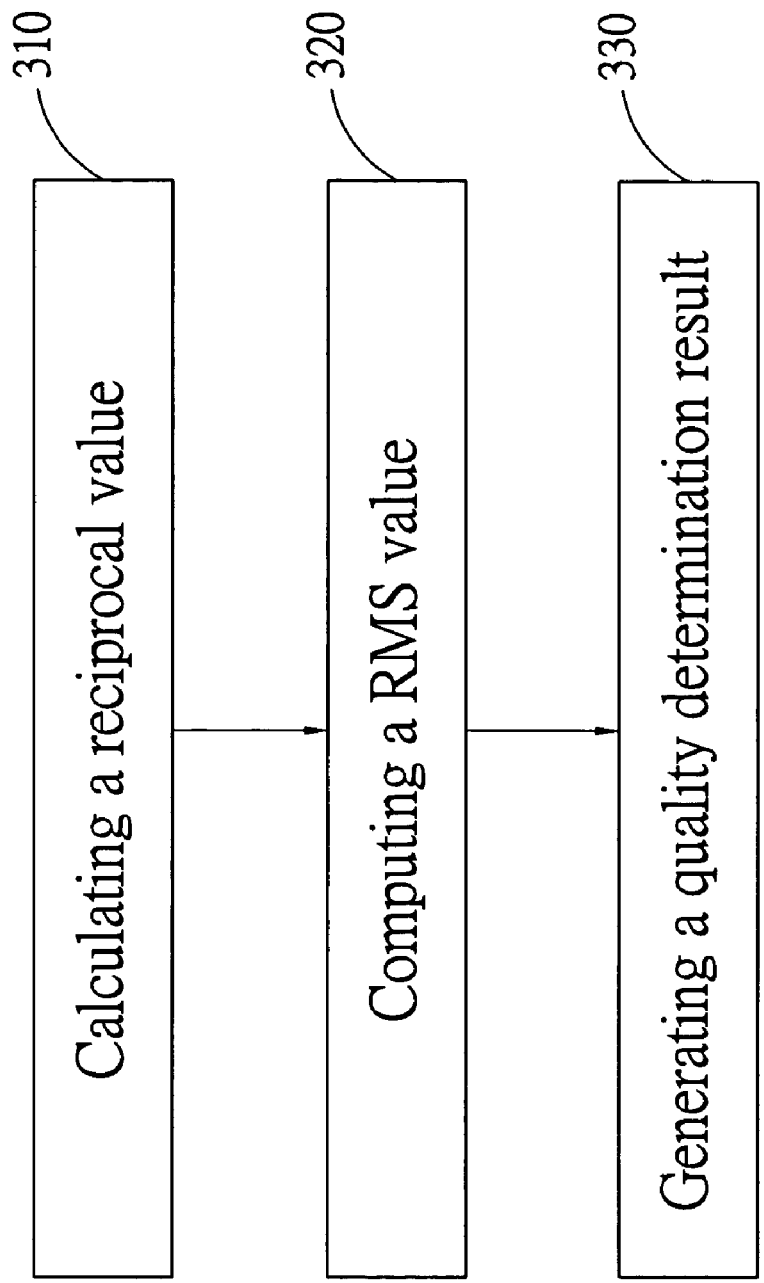
FIG. 3 is a diagram depicts a burst detection method of another embodiment in accordance with the present invention.

Please refer to FIG. 3, which shows a flowchart diagram of a burst detection method of an embodiment in accordance with the present invention. At first, a reciprocal value of the received signal's power is calculated at step 310. Next, proceeding to step 320, a RMS (root mean square) value of the soft-metric algorithm according to the received signal is computed. At last, a product of the reciprocal value calculated at step 310 and the RMS value computed at step 320 is compared with a given threshold value to generate a Boolean result as a quality determination decision at step 330. If the product of these values is lower than the given threshold value, it means the received signal is believed as noise; otherwise, it is believed as real signal.

It is noted that the processes of the step 310 and 320 can be parallel or in reverse timely order. The present invention applies to these implementations.

In another example, which is applicable in GSM, of the embodiment in accordance with the present invention, the powered received signal of step 310 is referred to the first 148 bits shown in the Table 1. When calculating the strength of signal, the entire or a portion of 148 bits are chosen to represent the strength of signal according to various needs. In this regards, the soft-metric algorithm of step 320 takes the 114 encrypted bits (e0~e56, e59~e115) as input. In case of the product of these values is lower than the given threshold value, it means the received signal is believed as noise. Therefore the frequency estimate of the AFC function of GSM specifications is cast away. Otherwise, when the product is larger than the given threshold value, the frequency estimate would be accepted.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the inventions as determined by the appended claims when interpreted in accordance with the breath to which they are fairly and legally entitled.

It is understood that several modifications, changes, and substitutions are intended in the foregoing disclosure and in some instances some features of the invention will be employed without a corresponding use of other features. Accordingly, it is appropriate that the appended claims be construed broadly and in a manner consistent with the scope of the invention.

The invention claimed is:

1. A burst detection apparatus for radio frequency receiver, the burst detection apparatus comprising:
    a power module directly receiving a plurality of input signals which comprises an in-phase input signal and a quadrature input signal, and calculating a reciprocal of an sum of said in-phase input signal's power and said quadrature input signal's power;
    a soft-metric RMS (Root Mean Square) module generating a soft metric value according to said plurality of input signals using an equalization algorithm and computing a RMS value of the soft metric value; and
    a quality determination module receiving said reciprocal directly from the power module and said RMS value directly from the soft-metric RMS module, and comparing a product of said reciprocal and said RMS value with a threshold value to generate a comparison Boolean result.

2. The burst detection apparatus of claim 1, wherein said plurality of input signals comprising information in a digital format which is down converted from a radio frequency signal and quantized by a analog-to-digital converter.

3. The burst detection apparatus of claim 1, wherein said plurality of input signals comprising 148 (one hundred and forty eight) bits in a GSM burst.

4. The burst detection apparatus of claim 1, wherein said soft metric computation is according to encrypted bits in a GSM burst.

5. The burst detection apparatus of claim 4, wherein said soft metric is computed according to 114 (one hundred and fourteen) encrypted bits in a GSM burst.

6. The burst detection apparatus of claim 1, wherein said quality determination result is configured to determine whether a frequency estimation of an automatic frequency control function is accepted.

7. A burst detection apparatus for radio frequency receiver, the burst detection apparatus comprising:
    an in-phase module calculating a sum of a plurality of in-phase input signals' power;
    an quadrature module calculating a sum of a plurality of quadrature input signals' power;
    a soft-metric equalizer module computing a series output of equalized soft metric according to an input signal;
    a root mean square module computing a root mean square value of said series output of soft-metric equalizer; and
    a quality determination module comparing a product of said RMS value and a reciprocal of said sums from said in-phase module and said quadrature module with a threshold value to generate a comparison Boolean result, wherein the input signal selected from the group comprising of the plurality of in-phase input signals and the plurality of quadrature input signals.

8. The burst detection apparatus of claim 7, wherein said input signal comprising an information in a digital format which is down converted from a radio frequency signal and quantized by a analog-to-digital converter.

9. The burst detection apparatus of claim 7, wherein said input signal comprising 148 (one hundred and forty eight) bits in a GSM burst.

10. The burst detection apparatus of claim 7, wherein said soft metric computation is according to encrypted bits in a GSM burst.

11. The burst detection apparatus of claim 10, wherein said soft metric is computed according to 114 (one hundred and fourteen) encrypted bits in a GSM burst.

12. The burst detection apparatus of claim 7, wherein said quality determination result is configured to determine whether a frequency estimation of an automatic frequency control function is accepted.

13. A burst detection method for radio frequency receiver, the burst detection method comprising:
receiving a plurality of input signals which comprises an in-phase input signal and a quadrature input signal by a power module;
calculating a reciprocal of an sum of said in-phase input signal's power and said quadrature input signal's power by said power module;
generating a soft metric value according to said plurality of input signals using an equalization algorithm by a soft-metric RMS (Root Mean Square) module;
computing a root mean square value of said soft metric value by said soft-metric RMS module;
receiving said reciprocal directly from the power module and said RMS value directly from the soft-metric RMS module by a quality determination module; and
comparing a product of said reciprocal and said root mean square value with a threshold value to generate a quality determination result by the quality determination module.

14. The burst detection method of claim 13, wherein said plurality of input signals comprising an information in a digital format which is down converted from a radio frequency signal and quantized by a analog-to-digital converter.

15. The burst detection method of claim 13, wherein said plurality of input signals comprising 148 (one hundred and forty eight) bits in a GSM burst.

16. The burst detection method of claim 13, wherein said soft metric calculation is according to encrypted bits in a GSM burst.

17. The burst detection method of claim 16, wherein said soft metric is computed according to 114 (one hundred and fourteen) encrypted bits in a GSM burst.

18. The burst detection method of claim 13, wherein said quality determination result is configured to determine whether a frequency estimation of an automatic frequency control function is accepted.

19. A burst detection apparatus for radio frequency receiver, the burst detection apparatus comprising:
a power module directly receiving a plurality of input signals which comprises an in-phase input signal and a quadrature input signal, and calculating a reciprocal of an sum of said in-phase input signal's power and said quadrature input signal's power;
a soft-metric RMS (Root Mean Square) module generating a soft metric value according to said plurality of input signals using an equalization algorithm and computing a RMS value of the soft metric value; and
a quality determination module receiving said reciprocal directly from the power module and said RMS value directly from the soft-metric RMS module, comparing a product of said reciprocal and said RMS value with a threshold value, determining that said input signal is noise if said product of said reciprocal and said RMS value is lower than said threshold value, and determining that said input signal is a real desired signal, otherwise.

20. A burst detection apparatus for radio frequency receiver, the burst detection apparatus comprising:
an in-phase module calculating a sum of a plurality of in-phase input signals' power;
an quadrature module calculating a sum of a plurality of quadrature input signals' power;
a soft-metric equalizer module computing a series output of soft metric equalizer according to an input signal;
a root mean square module computing a root mean square value of said series output of soft metric equalizer; and
a quality determination module comparing a product of said RMS value and a reciprocal of said sums from said in-phase module and said quadrature module with a threshold value, determining that said input signal is noise if said product of said reciprocal lower than said threshold value, and determining that said input signal is a real desired signal, otherwise,
wherein the input signal selected from the group comprising of the plurality of in-phase input signals and the plurality of quadrature input signals.

21. A burst detection method for radio frequency receiver, the burst detection method comprising:
receiving a plurality of input signals which comprises an in-phase input signal and a quadrature input signal by a power module;
calculating a reciprocal of an sum of said in-phase input signal's power and said quadrature input signal's power by said power module;
generating a soft metric value according to said plurality of input signals using an equalization algorithm by a soft-metric RMS module;
computing a RMS value of the soft metric value by the soft-metric RMS module;
receiving said reciprocal directly from the power module and said RMS value directly from the soft-metric RMS module by a quality determination module; and
comparing a product of said reciprocal directly from said power module and said root mean square value directly from said root mean square module with a threshold value by the quality determination module, determining that said input signal is noise if said product of said reciprocal and said root mean square value is lower than said threshold value, and determining that said input signal is a real desired signal, otherwise.

* * * * *